United States Patent
Sällström

(10) Patent No.: US 11,097,200 B2
(45) Date of Patent: Aug. 24, 2021

(54) APPARATUS AND METHOD FOR SEPARATION OF COMPONENTS WITH DIFFERENT VOLATILITY IN A MIXED FLUID

(71) Applicant: Rosenblad Design Aktiebolag, Hovås (SE)

(72) Inventor: Stig Sällström, Hovås (SE)

(73) Assignee: Rosenblad Design Aktiebolag, Hovås (SE)

( * ) Notice: Subject to any disclaimer, the term of this patent is extended or adjusted under 35 U.S.C. 154(b) by 0 days.

(21) Appl. No.: 16/625,291

(22) PCT Filed: Jun. 20, 2018

(86) PCT No.: PCT/SE2018/050669
§ 371 (c)(1),
(2) Date: Dec. 20, 2019

(87) PCT Pub. No.: WO2018/236282
PCT Pub. Date: Dec. 27, 2018

(65) Prior Publication Data
US 2020/0215452 A1    Jul. 9, 2020

(30) Foreign Application Priority Data
Jun. 21, 2017    (SE) .................................. 1750799-7

(51) Int. Cl.
*B01D 1/10* (2006.01)
*B01D 1/00* (2006.01)
(Continued)

(52) U.S. Cl.
CPC ............. *B01D 1/10* (2013.01); *B01D 1/0064* (2013.01); *B01D 1/0088* (2013.01); *B01D 1/065* (2013.01);
(Continued)

(58) Field of Classification Search
CPC ...... B01D 1/0064; B01D 1/0088; B01D 1/10; B01D 1/16; B01D 3/26; B01D 5/0012; B01D 5/006; C09F 3/00–02
See application file for complete search history.

(56) References Cited

U.S. PATENT DOCUMENTS

| 2,609,334 A | 9/1952 | Pyle et al. |
| 4,137,134 A | 1/1979 | Suominen et al. |

(Continued)

FOREIGN PATENT DOCUMENTS

| CA | 2256209 A1 | 6/1999 |
| EP | 2891861 A1 | 7/2015 |

(Continued)

OTHER PUBLICATIONS

International Search Report and Written Opinion from International Application No. PCT/SE2018/050669 dated Jun. 29, 2018.

*Primary Examiner* — Renee Robinson
(74) *Attorney, Agent, or Firm* — Marshall, Gerstein & Borun LLP

(57) ABSTRACT

The invention concerns an apparatus (10) for separation of components with different volatility in a mixed fluid, said apparatus (10) comprising: a first heat exchanging unit (100) provided with first and second flow path structures (131, 132) forming separate flow paths for a first and a second fluid flow through the first heat-exchanging unit (100); an inlet (118) for feeding the mixed fluid to the apparatus (10); an inlet (119) for feeding steam to the apparatus (10); an arrangement for feeding a cooling medium through the apparatus (10), wherein said arrangement comprises at least one cooling medium inlet (105, 106, 107, 108). The invention is characterized in that the apparatus (10) comprises a second heat-exchanging unit (200) provided with third and fourth flow path structures (233, 234) forming separate flow paths for a first and a second fluid flow through the second (Continued)

heat-exchanging unit (200), wherein the cooling medium arrangement comprises at least one cooling medium inlet (205, 206, 207, 208) arranged in fluid communication with the fourth flow path structure (234) and wherein the first and third flow path structures (131, 233) are arranged in fluid communication with each other.

32 Claims, 7 Drawing Sheets

(51) Int. Cl.

| | | |
|---|---|---|
| *B01D 1/06* | (2006.01) | |
| *B01D 1/16* | (2006.01) | |
| *B01D 5/00* | (2006.01) | |
| *C09F 3/00* | (2006.01) | |
| *D21C 11/00* | (2006.01) | |
| *F28B 1/02* | (2006.01) | |
| *F28D 7/00* | (2006.01) | |
| *F28D 7/16* | (2006.01) | |

(52) U.S. Cl.
CPC ............... *B01D 1/16* (2013.01); *B01D 5/006* (2013.01); *B01D 5/0012* (2013.01); *C09F 3/00* (2013.01); *D21C 11/0042* (2013.01); *F28B 1/02* (2013.01); *F28D 7/0075* (2013.01); *F28D 7/1669* (2013.01)

(56) References Cited

U.S. PATENT DOCUMENTS

| | | |
|---|---|---|
| 5,385,646 A | 1/1995 | Holiday |
| 6,821,382 B1 * | 11/2004 | Lundgren .............. D21C 11/06 159/17.1 |
| 2016/0327341 A1 * | 11/2016 | Artamo .................. F28D 7/103 |

FOREIGN PATENT DOCUMENTS

| | | |
|---|---|---|
| JP | S60193579 A | 10/1985 |
| WO | WO-0001879 A1 | 1/2000 |
| WO | WO-03/078014 A1 | 9/2003 |
| WO | WO-2014/009762 A1 | 1/2014 |

* cited by examiner

APPARATUS AND METHOD FOR SEPARATION OF COMPONENTS WITH DIFFERENT VOLATILITY IN A MIXED FLUID

CROSS-REFERENCE TO RELATED APPLICATIONS

This is a U.S. National Phase of International Application No. PCT/SE2018/050669, filed Jun. 20, 2018, which claims priority to Swedish Application No. 1750799-7, filed Jun. 21, 2017.

TECHNICAL FIELD

The invention relates to an apparatus for separation of components with different volatility in a mixed fluid, such as an unclean condensate generated in a plant for producing chemical or semi-chemical cellulose pulp, according to the preamble of claim 1. The invention also relates to a plant comprising such an apparatus and to a method for carrying out such a separation.

BACKGROUND OF THE INVENTION

Chemical cellulose pulp is produced from wood chips or other lignocellulose material that is dissolved using an acid or alkaline process. During cooking/dissolution the main part of the lignin of the wood, and especially the lignin which mainly forms the middle lamella between the uncountable wood fibres goes in solution in the cooking liquid so that the fibres after the digestion end, for example after blowing of the cook according to the batchwise cooking method are separated from each other and form a cellulose pulp. Besides a large part of for instance the lignin content of the wood, a considerable part of the hemicellulose of the wood dissolves in the solution. How large this part gets is determined by the pulping degree, which in general is represented as cooking yield in percent. Also a minor part of the wood cellulose content can go into solution.

An example of an acid cooking process is the sulphite process and an example of the alkaline cooking process is the sulphate process.

Other known alkaline cooking processes are the polysulfide pulping process and processes of soda type (sodium hydroxide) process, where catalysts such as quinone compounds can be used. The term sulphate process includes several methods such as the use of high sulfidity pulping, the use of counter current cooking where white liquor (primarily a mixture of sodium hydroxide and sodium sulphide) is added at a late stage of the cooking phase and the use of a chemical treatment of the lignocellulose material, prior to the actual sulphate pulping process.

The sulphite method or- process can be divided up according to the base used in the cooking liquor, such as calcium, magnesium, ammonium or sodium. The sodium and magnesium cooking liquors are usually recovered and thus become of interest in this case.

After dissolution of the lignocellulose material the cooking liquor is separated from the fibres. This cooking liquor is often denoted black liquor or spent liquor or, in connection with chemical recovery, thin liquor, and it contains mainly water. The dry solid content (lignin, hemicellulose, cellulose, residual chemicals, etc.) in this thin liquor is typically in the range 15-20%.

To allow combustion of the black/thin liquor in, for instance, a soda recovery boiler, the dry solid content must typically be increased to at least around 55%. During the combustion process the organic compounds are transformed mainly to carbon dioxide and water while producing heat. The inorganic compounds form a smelt residual, which is used in the production of new, fresh cooking liquor The black liquor with high dry solid content is usually denoted thick liquor. Thick liquor is produced by evaporation of the thin liquor, typically in five to seven steps/stages.

In modem chemical cellulose pulp plants an ambition is to reduce the fresh water consumption as much as possible and to reduce the discharge of waste liquor to the recipient. This is achieved by closing, to the degree possible, the entire liquid system. Typically, this means that spent liquor from the bleaching stages is recovered and mixed with spent cooking liquor (black/thin liquor). The thin liquor can therefore contain a mixture of spent cooking liquor and spent liquor from various bleaching steps.

Evaporation of thin liquor generates condensate. Some condensate streams from the evaporation process, e.g. streams from some of the evaporation stages, may be relatively clean and such condensates may be possible to use at one or several positions in the pulp plant. Other streams generated in the evaporation process may contain unclean or very unclean condensate.

This disclosure relates in particular to the purification of unclean (foul, impure) condensates generated at pulp plants, typically condensates of the type described above.

Production of chemical cellulose pulp generates also other types of unclean condensates. Dissolution of lignocellulose material is carried out under a certain pressure, which leads to a release of a gas mixture containing steam and various organic and inorganic compounds from the dissolution/cooking vessel. Such gas mixtures are produced both in batch-wise and continuous processes. The gas mixture is usually made to condensate and mixed with the unclean evaporation condensate.

Besides chemical pulping processes, there are several semi-chemical pulping processes, such as the neutral sulphite semichemical process, (NSSC). The chemical pulping degree is relatively low for this type of process so a subsequent mechanical defibration is therefore necessary. In some cases the cooking/treatment liquor is subject to evaporation and the present invention is suitable for purifying of unclean condensate also from such an evaporation process.

Conventionally, purification of unclean condensate includes a step called stripping, wherein unclean condensate is subject to steam through blow so that volatile compounds in the unclean condensate follow the steam and hence leave the condensate. Separate or isolated stripper equipment is normally used. The steam used is often admission steam generated in the recovery boiler or steam from an evaporator stage in the evaporation plant. Such conventional purification of unclean condensate is operated at atmospheric pressure or above.

The Swedish letters patent 7704352-9 (423915) discloses a method for recovery of sulphur compounds, volatile alcohols, such as methanol, and by-products such as turpentine and similar compounds from unclean condensate. However, the technique described in that patent is not sufficiently cost effective, mainly due to the use of isolated stripper equipment and to the too large use of high-quality admission steam.

WO0001879 discloses a system addressing the problems and drawbacks mentioned above. The proposed system includes four condensers arranged side by side in series, wherein the first of these forms a combined stripper-condenser. Unclean (contaminated) condensate is fed to open ends of tubes at the top part of the stripper-condenser and steam is fed to open ends of the same tubes at the bottom part of the stripper-condenser. A flow of cooling medium is arranged to cool the tubes of the four condensers. Clean condensate is generated mainly at the bottom of the stripper-condenser. Some portion of the steam, as well as volatile compounds, leaves the stripper-condenser at its top and flows to the top of and downwards through the second condenser. Mainly water and turpentine is condensed in the second condenser. Some portion of the steam is guided from the bottom of the second condenser to the bottom of the third condenser, flows upwards through the third condenser and enters the top of the fourth condenser where mainly methanol is condensed. Unclean water and a portion of the flow of condensed methanol are subject to recirculation in the system.

The system disclosed in WO0001879 was indeed an improvement in relation to the technique known at the time. However, there is a need for further improvements to meet the present demands on cost efficiency (installation cost, operational cost) and process efficiency (separation efficiency, purity, mass flows, etc.).

SUMMARY OF THE INVENTION

An object of this invention is to provide a system and method for treatment of a mixed fluid containing components having different volatility, in particular an unclean condensate of the type described above, where the system and method exhibit improved cost and process efficiency compared to known systems. This object is achieved by the apparatus, plant and method defined by the technical features contained in the independent claims. The dependent claims contain advantageous embodiments, further developments and variants of the invention.

The invention concerns an apparatus for separation of components with different volatility in a mixed fluid, such as an unclean condensate generated in a plant for producing chemical or semi-chemical cellulose pulp, said apparatus comprising:
 a first heat-exchanging unit provided with first and second flow path structures extending between a first and a second end portion thereof and forming separate flow paths for a first and a second fluid flow through the first heat-exchanging unit,
wherein the first end portion is intended to form an upper portion and the second end portion is intended to form a lower portion of the first heat-exchanging unit during operation of the apparatus,
 an inlet for feeding the mixed fluid to the apparatus, wherein the mixed fluid feeding inlet is arranged in fluid communication with the first flow path structure at the upper end portion of the first heat-exchanging unit,
 an inlet for feeding steam to the apparatus, wherein the steam feeding inlet is arranged in fluid communication with the first flow path structure at the lower end portion of the heat-exchanging separation unit, and
 an arrangement for feeding a cooling medium through the apparatus, wherein said arrangement comprises at least one cooling medium inlet arranged in fluid communication with the second flow path structure at the first (upper) end portion of the first heat-exchanging unit.

The invention is characterized in that the apparatus comprises a second heat-exchanging unit arranged at the first end portion of the first heat-exchanging unit so as to be located above the first heat-exchanging unit during operation of the apparatus. The second heat-exchanging unit is provided with third and fourth flow path structures extending between a first/upper and a second/lower end portion thereof and forming separate flow paths for a first and a second fluid flow through the second heat-exchanging unit, wherein the first portion is intended to form an upper end portion and the second portion a lower end portion of the second heat-exchanging unit during operation of the apparatus. Further, the cooling medium arrangement comprises at least one cooling medium inlet arranged in fluid communication with the fourth flow path structure at the first (upper) end portion of the second heat-exchanging unit, and the first and third flow path structures are arranged in fluid communication with each other so that a flow of evaporated fluid exiting the first flow path structure at the upper end portion of the first heat-exchanging unit can flow further upwards into the third flow path structure of the second heat-exchanging unit and so that a flow of condensed fluid exiting the third flow path structure at the lower end portion of the second heat-exchanging unit can flow further downwards into the first flow path structure of the first heat-exchanging unit.

This design makes it possible to feed cooling medium, typically cooling water, to the upper portion of both the first and the second heat-exchanging units and let the cooling medium form a downwards directed second flow through the two heat-exchanging units. In turn, this makes it possible to bring about a 100% counter-current flow between the flow of cooling medium and that part of the first flow that is present in evaporated form and flows upwards through the two heat-exchanging units.

Such a counter-current flow provides for a higher temperature difference and more efficient separation of the components with different volatility than a parallel flow heat-exchanger, which is (partly) used in the apparatus disclosed in WO0001879. Accordingly, an advantageous effect of the present invention is an improved separation efficiency, which can be used to achieve a higher purity of the products or to achieve a similar purity with a smaller and more cost-efficient apparatus (or, of course, something in between, such as a somewhat higher purity using a somewhat smaller apparatus). As an example, the present invention dispenses with the need for using three heat-exchangers before the methanol can be condensed as required in the device disclosed in WO0001879.

A further advantage of the inventive design is that the reflux of condensed fluid in the first flow, which contains a mix of liquid that flows downwards and evaporated fluid that flows upwards through the first and third flow path structures, can flow/run downwards all the way from the upper part of the second (upper) heat-exchanging unit to the lower part of the first (lower) heat-exchanging unit without the need for any pump. This makes the apparatus energy efficient. (It may be noted that the composition of the condensed liquid varies along the height of the apparatus so it is not the same liquid that flows/runs all the way through the apparatus.)

The flow of cooling medium can be arranged as one single general counter-flow by feeding fresh (cold) cooling medium to the upper portion of the second (upper) heat-changing unit (i.e. to the upper part of the fourth flow path structure) and allow the cooling medium to continue to flow further downwards through the first (lower) heat-exchanging unit (via the second flow path structure) towards an outlet at the bottom of the first (lower) heat exchanging unit.

A variant of this, which has shown to be advantageous in some applications and certain operation modes, is to arrange for a by-pass flow downstream the second (upper) heat-exchanging unit) so that a portion of the flow of cooling medium leaving the lower portion of the second (upper) heat-exchanging unit can be prevented from entering the first (lower) heat-exchanging unit. This way the flow of cooling medium through the first (lower) heat-exchanging unit can be decreased so as to increase the flow of steam to the second (upper) heat-exchanging unit.

In a further variant the apparatus can be configured so that fresh (cold) cooling medium can be fed not only to the top portion of the apparatus but also to the upper portion of the first (lower) heat-changing unit (i.e. to the upper part of the second flow path structure). A portion of the partly heated cooling medium leaving the second (upper) heat-exchanging unit may still be allowed to enter the first (lower) heat-exchanging unit together with the fresh cooling medium. As a further alternative two separate cooling medium systems may be used, one for the first heat-exchanging unit and another for the second heat-exchanging unit, both with inlet at the top and outlet at the bottom.

General effects of the inventive apparatus are thus improvements in separation and energy efficiency.

In an embodiment of the invention the second and fourth flow path structures are arranged in fluid communication with each other so that a flow of cooling medium exiting the fourth flow path structure at the lower end portion of the second heat-exchanging unit can flow further downwards into the second flow path structure of the first heat-exchanging unit. Thereby fresh (cold) cooling medium can be fed to the upper portion of the second (upper) heat-changing unit (i.e. to the upper part of the fourth flow path structure) and provide for the counter-current flow through both heat-exchanging units as described above. How to arrange the fluid communication, i.e. how to connect the second and fourth flow path structures, depends on the particular structure of the apparatus.

In an embodiment of the invention the apparatus is provided with a cooling medium by-pass duct arranged in fluid communication with the fourth flow path structure, preferably in connection to the lower end portion of the second heat-exchanging unit, so that at least a portion of the cooling medium flowing downwards through the second heat-exchanging unit towards the first heat-exchanging unit during operation of the apparatus can be fed out from the apparatus before reaching the first heat-exchanging unit. As mentioned above, this makes it possible to decrease the flow of cooling medium through the first (lower) heat exchanging unit and increase the amount of steam reaching the second (upper) heat-exchanging unit.

In an embodiment of the invention a main cooling medium feed inlet is arranged at the upper end portion of the second heat-exchanging unit in fluid communication with the fourth flow path structure. The apparatus may be provided with complementary cooling medium feed inlets.

In an embodiment of the invention the first flow path structure comprises a set of channels having open ends at the lower and upper end portions of the first heat-exchanging unit, and wherein the second flow path structure extends along an outside of the channels so as to allow heat transfer through walls of the channels between a fluid inside the channels and another fluid outside of the channels. Preferably, the channels form a set of separated open-ended tubes, wherein the second flow path structure is formed along, outside of and between the tubes (and inside of an outer housing of the apparatus).

The second heat-exchanging unit may be configured in principally the same way as the first heat-exchanging unit, i.e. the third flow path structure may also comprise a set of channels in the form of tubes and the fourth flow path structure may be formed between the tubes. However, the size of the first and second heat-exchanging unit may differ. In many applications the mass flows will be larger in the first (lower) heat-exchanging unit than in the second (upper) heat-exchanging unit and in such cases the second heat-exchanging unit can be made smaller, which saves material cost and simplifies installation.

In an embodiment of the invention a first sealing plate is arranged at the upper end portion of the first heat-exchanging unit, wherein the sealing plate extends across the first heat-exchanging unit and forms an upper limitation for the second flow path structure. Preferably, the sealing plate is provided with holes adapted to the channels of the first flow path structure allowing the channels to extend in a sealed manner to or through the holes so that a fluid in the first flow path structure can pass the sealing plate but not a fluid in the second flow path structure.

Because the inlet for feeding the mixed fluid to the apparatus is arranged at the upper end portion of the first heat-exchanging unit, and because the mixed fluid is intended to flow in the first and third flow path structures, some arrangement is needed in this region of the apparatus to allow the mixed fluid to be fed to the intended flow path structures, to allow the cooling medium to flow as intended, and to avoid mixing of the two flows. The first sealing plate forms part of this arrangement. Together with e.g. a similar sealing plate arranged at the lower portion of the second (upper) heat-exchanging unit, it allows the inlet for the mixed fluid to be located above the first sealing plate, between the first and second heat-exchanging units. One or several inlets for the cooling medium at the upper portion of the first heat-exchanging unit can be provided in the first sealing plate or in an outer housing of the apparatus. A pipe is preferably connected to each of the cooling medium inlets.

In an embodiment of the invention a second sealing plate is arranged at the lower end portion of the first heat-exchanging unit, wherein the sealing plate extends across the first heat-exchanging unit and forms a lower limitation for the second flow path structure. Preferably, the also the second sealing plate is provided with holes adapted to the channels of the first flow path structure allowing the channels to extend in a sealed manner to or through the holes so that a fluid in the first flow path structure can pass the second sealing plate but not a fluid in the second flow path structure.

Together with an outer housing of the apparatus, the first and second sealing plates defines a space forming the second flow path structure, wherein the first flow path channels/tubes extend between the two sealing plates. Cooling medium can flow through this space by providing an inlet at the upper portion of this space and an outlet in the lower portion, for instance in the outer housing.

In an embodiment of the invention a first distribution plate for the cooling medium is arranged at the upper end portion of the first heat-exchanging unit, wherein the first distribution plate extends across the first heat-exchanging unit at some distance below the first sealing plate so as to form an accumulation space for cooling medium between the first sealing plate and the first distribution plate. Such an accumulation space is useful for distributing the cooling medium evenly over the cross-sectional area of the first heat-exchanging unit. If the cooling medium inlet is located in the housing on the side of the apparatus (between the first distribution plate and the first sealing plate) the cooling medium can still be distributed laterally. The first distribution plate can be provided with a plurality of relatively small drainage holes distributed over the first distribution plate.

Preferably, the first distribution plate is provided with channel holes that fit circumferentially around the channels but that are slightly larger than the channels so that narrow drainage openings are formed at or along a circumference of the outer walls of the channels. This means that the cooling medium will flow/run downwards along the channel walls (and not drop/fall between the channels) which leads to a highly efficient heat exchange.

Preferably, spacing elements are arranged at the drainage openings between the outer walls of the channels and the first distribution plate so as to position the channel properly in the channel hole. Preferably, the spacing elements form part of the first distribution plate. In case the channels form circular tubes a drainage opening can form an annular opening around the outer wall of the tube, wherein the annular opening is interrupted by a plurality of spacing elements distributed around the opening.

In an embodiment of the invention the second heat-exchanging unit is arranged in principally the same way as the first heat-exchanging unit, i.e. with a third sealing plate arranged at the upper portion, a fourth sealing plate arranged at the lower portion, a second distribution plate provided with drainage openings arranged at the upper portion (some distance below the third sealing plate), a (primary) cooling medium inlet arranged in association with the second accumulation space formed between the second distribution plate and the third sealing plate, etc. The structure of the second heat-exchanging unit may, however, partly differ from that of the first heat-exchanging unit.

Cooling medium can be allowed to flow from the second (upper) heat-exchanging unit to the first (lower) heat-exchanging unit by providing an outlet at/above the fourth sealing plate (at the bottom of the upper heat exchanger) and providing an inlet in association with the accumulation space between the first distribution plate and the first sealing plate (at the top of the lower heat exchanger) and connecting the inlet and outlet via e.g. a pipe.

The fourth sealing plate at the lower portion of the second heat-exchanging unit makes it possible to arrange a central space between the first and fourth sealing plates that is in fluid communication with the first and the third flow path structures but not with the second and fourth flow path structures. Preferably, the inlet for feeding mixed liquid to the apparatus is arranged in association with this central space.

In an embodiment of the invention an outlet for removing condensed components of the incoming mixed fluid from the apparatus is arranged in the lower portion of the first heat-exchanging unit in fluid communication with the first flow path structure. In the exemplified use of the apparatus where the mixed fluid to be treated is an unclean condensate generated in a plant for producing chemical or semi-chemical cellulose pulp, the condensed components removed through this outlet would be a "clean condensate" (i.e. mostly water but with some small content of other substances).

In an embodiment of the invention an outlet for removing evaporated components of the incoming mixed fluid from the apparatus is arranged in the upper portion of the second heat-exchanging unit in fluid communication with the third flow path structure. In the pulp plant example mentioned above, the evaporated components removed through this outlet would be methanol and non-condensable gases. These gases can be tapped off from the flow of methanol.

In an embodiment of the invention an inlet for feeding recirculated components to the apparatus, preferably a fraction of components previously removed in evaporated form, is arranged in the upper portion of the second heat-exchanging unit in fluid communication with the third flow path structure. Such recirculation, or feed-back, improves separation efficiency and is known as such.

In an embodiment of the invention the inlet for feeding the recirculated components to the apparatus comprises at least one spray nozzle. Preferably a plurality of nozzles are arranged to distribute the flow of recirculated components more or less evenly over the entire cross-sectional area of the apparatus.

In an embodiment of the invention the apparatus comprises an upper space arranged at the upper portion of the second heat-exchanging unit, wherein the upper space is in fluid communication with the third flow path structure, the inlet for feeding the recirculated components to the apparatus and the outlet for removing evaporated components of the incoming mixed fluid from the apparatus.

In an embodiment of the invention the apparatus comprises a central space between the first and the second heat-exchanging units, wherein the central space forms a fluid communication between the first and the third flow path structure.

In an embodiment of the invention a central outlet is arranged in the central space for removing components that accumulate in the central space. In the pulp plant example mentioned above, the accumulated component removed through this outlet would be turpentine.

In an embodiment of the invention the inlet for feeding the mixed fluid to the apparatus is arranged in the central space.

In an embodiment of the invention the inlet for feeding the mixed fluid to the apparatus comprises at least one spray nozzle arranged on an inside of the apparatus above the first heat-exchanging unit. Preferably, a plurality of nozzles are arranged to distribute the mixed liquid more or less evenly over the entire cross-sectional area of the apparatus.

In an embodiment of the invention the apparatus comprises a lower space arranged at the lower portion of the first heat-exchanging unit, wherein the lower space is in fluid communication with the first flow path structure, the inlet for feeding steam to the apparatus and the outlet for removing condensed components of the incoming mixed fluid from the apparatus.

In an embodiment of the invention the apparatus comprises a housing that forms an outer limitation for at least the second and fourth flow path structures and for a central space between the first and second heat-exchanging units.

In an embodiment of the invention wherein a flow of mixed liquid and steam is intended to form the first flow and a flow of cooling medium is intended to form the second flow during operation of the apparatus.

The invention also concerns a plant for producing chemical or semi-chemical cellulose pulp, wherein the plant comprises an apparatus of the above type.

In an embodiment of the invention the plant comprises equipment that, during operation of the plant, generates an unclean condensate containing components with different volatility, wherein the plant is configured to feed the unclean condensate to the mixed fluid feeding inlet of the apparatus.

The invention also concerns a method for separation of components with different volatility in a mixed fluid using an apparatus of the above type. The method comprises the steps of: feeding the mixed fluid to the mixed fluid feeding inlet; feeding steam to the steam feeding inlet; feeding coolant medium to the fourth flow path structure at the upper end portion of the second heat-exchanging unit; removing condensed components of the incoming mixed fluid from the apparatus via a first outlet arranged in the lower end portion of the first heat-exchanging unit in fluid communication with the first flow path structure; removing evaporated components of the incoming mixed fluid from the apparatus via a second outlet arranged in the upper portion of the second heat-exchanging unit in fluid communication with the third flow path structure; and removing heated coolant medium from the second flow path structure at the lower end portion of the first heat-exchanging unit.

In an embodiment of the invention the method further comprises the step of feeding recirculated components to the apparatus, preferably a fraction of the components removed in evaporated form, via an inlet arranged in the upper end portion of the second heat-exchanging unit in fluid communication with the third flow path structure. Preferably, the mixed fluid is an unclean condensate generated in a plant for producing chemical or semi-chemical cellulose pulp. Preferably, the evaporated components include methanol.

BRIEF DESCRIPTION OF DRAWINGS

In the description of the invention given below reference is made to the following figure, in which.

DESCRIPTION OF EXAMPLE EMBODIMENTS OF THE INVENTION

Figure 1:
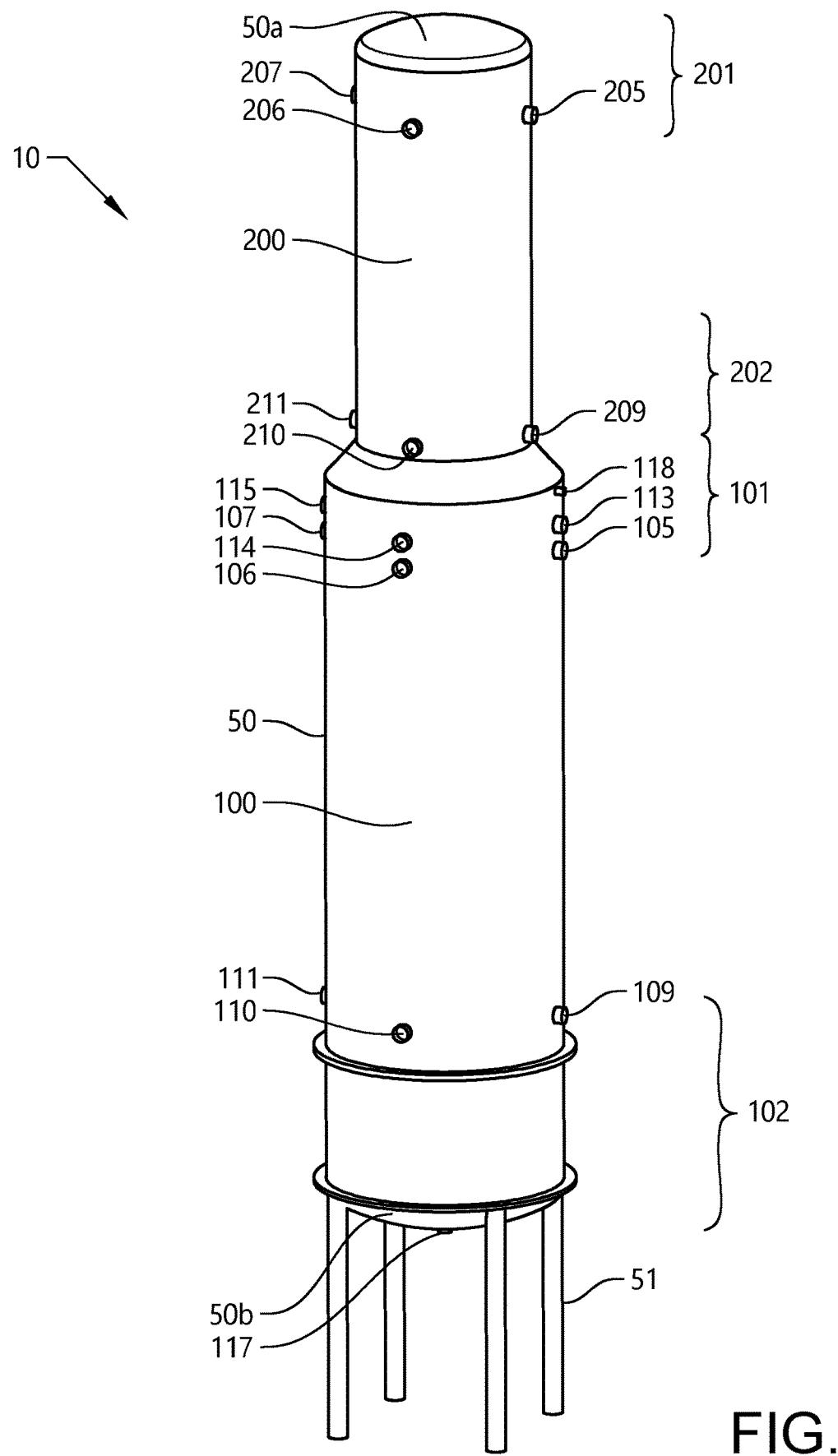
FIG. 1 shows, in a first perspective view, an embodiment of an apparatus according to the invention.

FIGS. 1-6 shows an embodiment of an apparatus 10 according to the invention. FIG. 7 shows a schematic view of a process flow diagram, including the apparatus 10, relating to separation of components with different volatility in a mixed fluid in the form of unclean condensate generated in a plant for producing chemical or semi-chemical cellulose pulp.

As shown in FIGS. 1-5, the apparatus is vertically arranged and comprises a first heat-exchanging unit 100 that has a first, upper end portion 101 and a second, lower end portion 102, and the apparatus 10 further comprises a second heat-exchanging unit 200 that also has a first, upper end portion 201 and a second, lower end portion 202. The second heat-exchanging unit 200 is arranged on top of the first unit 100. The apparatus 10 is provided with an outer housing 50 that encloses the two heat-exchanging units 100, 200. The housing 50 includes a lid 50a and a bottom 50b. The apparatus 10 is arranged on legs 51 provided at the bottom 50b.

Figure 3:
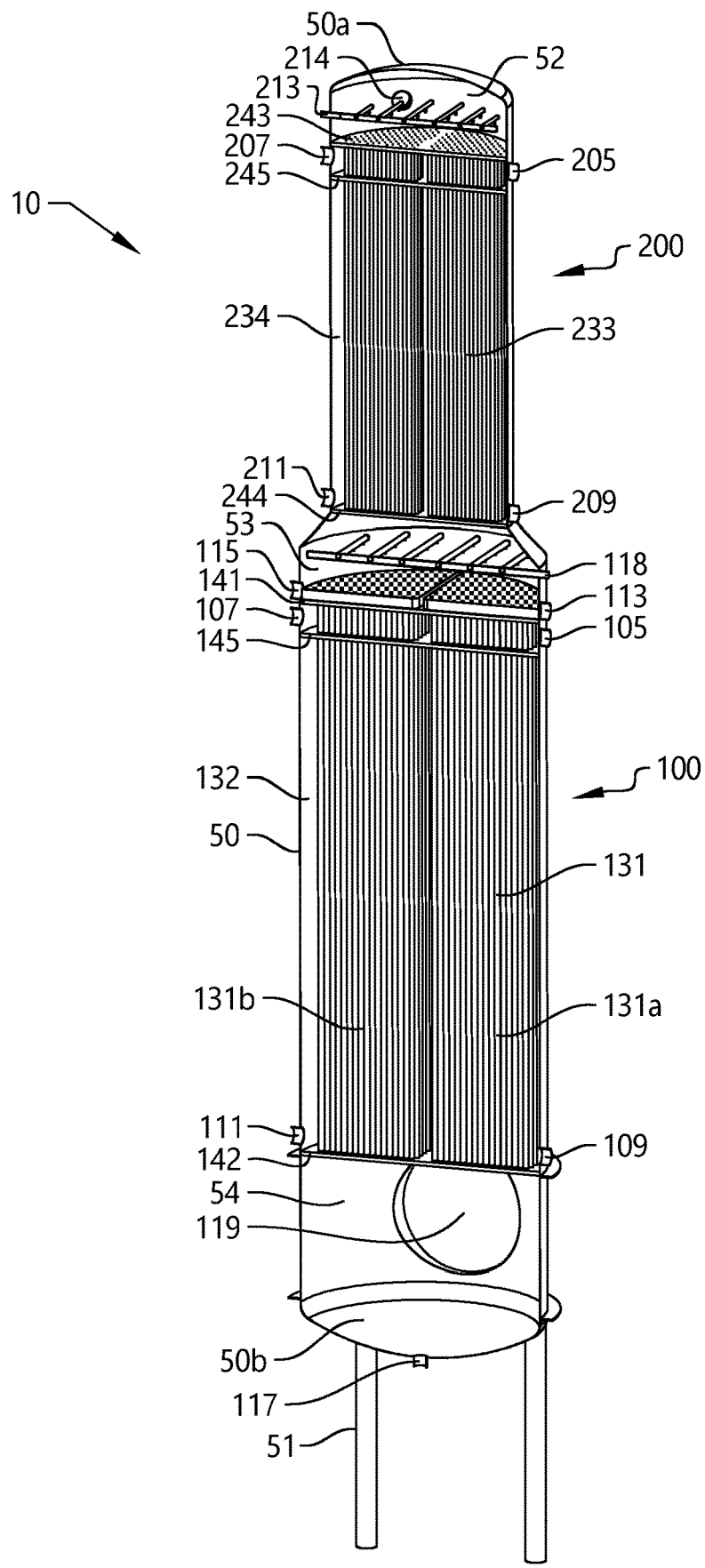
FIG. 3 shows a cross-sectional view of the apparatus of FIG. 1.

The first heat-exchanging unit 100 is provided with first and second flow path structures in the form of tubes 131 and a space 132 surrounding the tubes 131, respectively (see FIG. 3). The flow paths 131, 132 extend between the first and second end portions 101, 102 and form separate flow paths for a first and a second fluid flow through the first heat-exchanging unit.

The second heat-exchanging unit 200 is in this example configured in a principally similar way as the first unit 100 and is provided with third and fourth flow path structures in the form of tubes 233 and a space 234 surrounding the tubes 233, respectively (see FIG. 3). The third and fourth flow paths 233, 234 extend between the first and second end portions 201, 202 and form separate flow paths for a first and a second fluid flow through the second heat-exchanging unit 200.

As shown in FIG. 3, the apparatus 10 comprises an upper space 52 at the upper portion of the second heat exchanging unit 200 (under the lid 50a), a central space 53 between the first and second units 100, 200, and a lower space 54 at the lower portion of the first heat-exchanging unit 100 (above the bottom 50b).

The first and third flow path structures 131, 233, i.e. the tubes of the first and second unit 100, 200, are arranged in fluid communication with each other via the central space 53 so that a flow of evaporated fluid exiting the tubes 131 at the upper end portion 101 of the first heat-exchanging unit 100 can flow further upwards into the tubes 233 of the second heat-exchanging unit 200 and so that a flow of condensed fluid exiting the tubes 233 at the lower end portion 202 of the second heat-exchanging unit 200 can flow further downwards into the tubes 131 of the first heat-exchanging unit 100.

An inlet 118 for feeding the mixed fluid to the apparatus 10 is arranged in the central space 53. The mixed fluid feeding inlet 118 is arranged in fluid communication with the first and third flow path structures 131, 233 at the upper end portion 101 of the first heat-exchanging unit 100 (and also at the lower end portion 202 of the second heat-exchanging unit 200 since the central space 53 is arranged in association with both portions 101 and 202).

Figure 5:
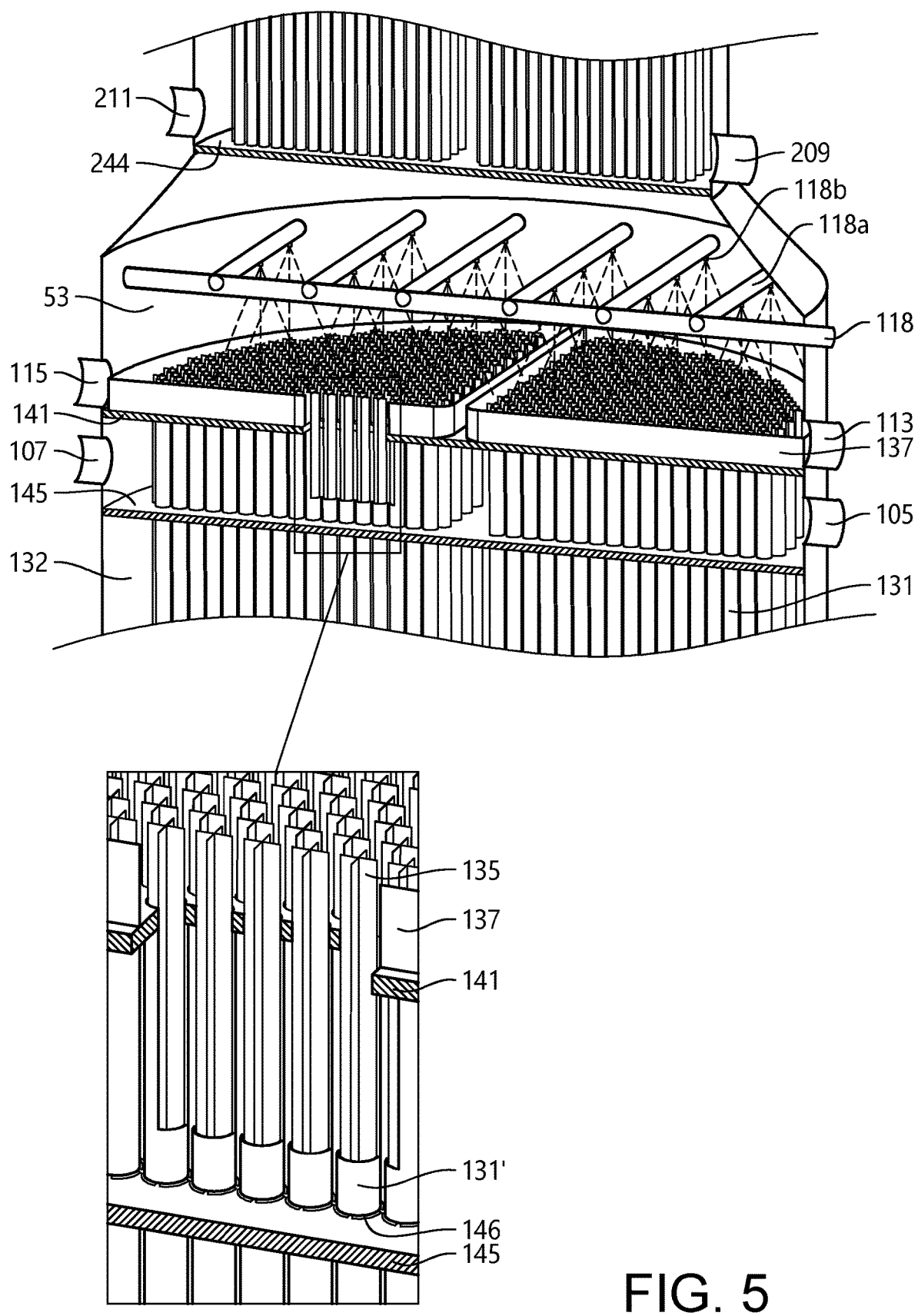
FIG. 5 shows a magnified view a central part of the cross-section of FIG. 3, including a further magnified view of some parts.

As shown in FIGS. 3 and 5 the inlet 118 for feeding the mixed fluid to the apparatus 10 comprises a number of pipes 118a and spray nozzles 118b arranged on an inside of the apparatus 10 above the first heat-exchanging unit 100 in the central space 53. The nozzles 118b are arranged to distribute the mixed liquid over the cross-sectional area of the apparatus 10.

Figure 2:
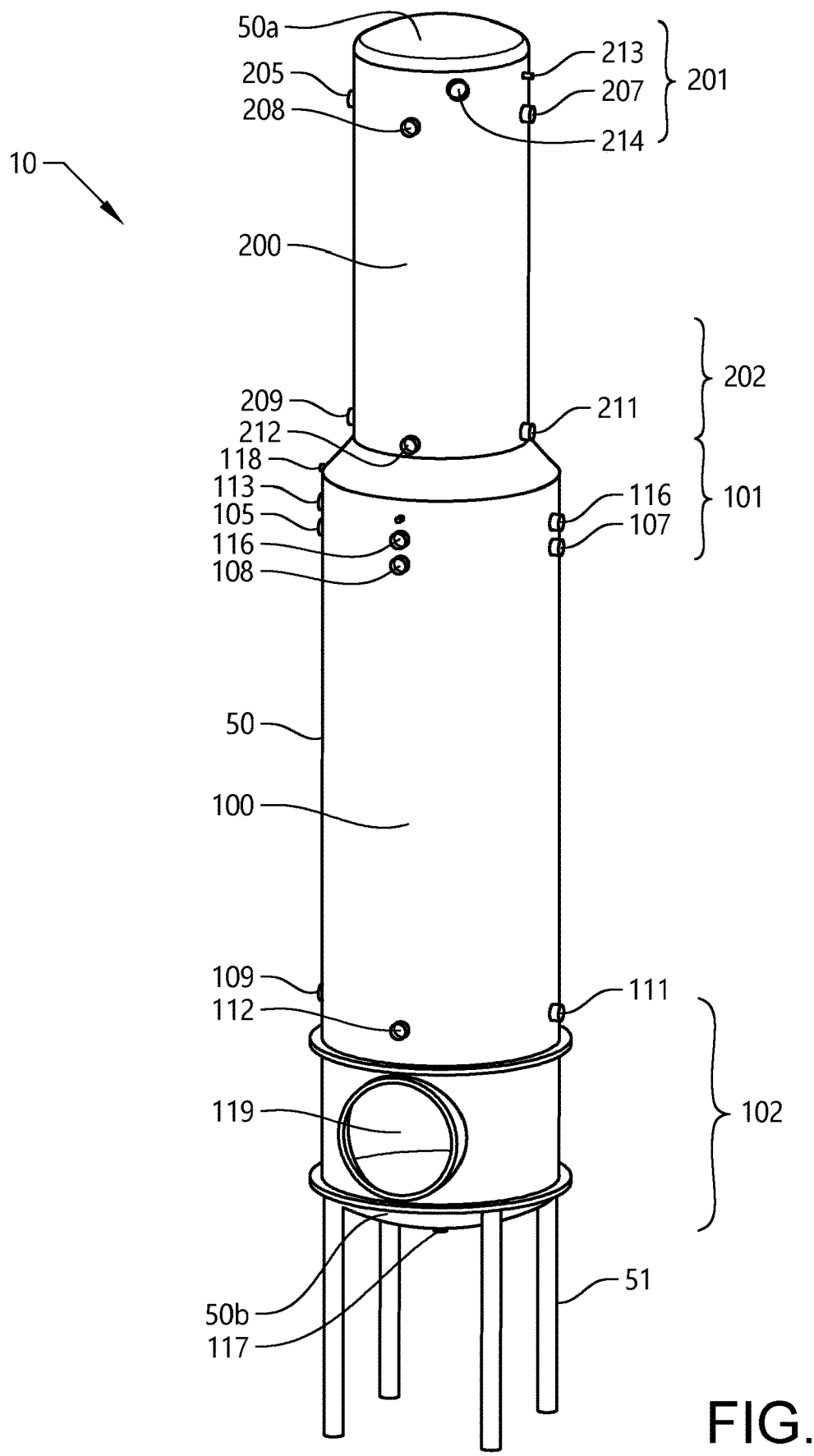
FIG. 2 shows, in a second perspective view, the apparatus of FIG. 1.

An inlet 119 for feeding steam to the apparatus 10 is arranged in the lower space 54 in fluid communication with the first flow path structure 131 at the lower end portion 102 of the first heat-exchanging separation unit 100 (see FIGS. 2 and 3).

The apparatus 10 further comprises an arrangement for feeding a cooling medium (water) through the apparatus 10. In this example this arrangement comprises (in flow order):

four main cooling water inlets 205-208 distributed around the apparatus 10 at the first (upper) end portion 201 of the second heat-exchanging unit 200 arranged in fluid communication with the fourth flow path structure 234;

the fourth flow path structure 234, i.e. the space surrounding the tubes 233;

four cooling water outlets 209-212 distributed around the apparatus 10 at the second (lower) end portion 202 of the second heat-exchanging unit 200 arranged in fluid communication with the fourth flow path structure 234;

a water pipe structure (not shown in the figures) connecting the four water outlets 209-212 with:

four cooling water inlets 105-108 distributed around the apparatus 10 at the first (upper) end portion 101 of the first heat-exchanging unit 100 arranged in fluid communication with the second flow path structure 132;

a cooling water by-pass duct 60 including a valve 61 (not shown in apparatus figures, see process scheme figure)

allowing a part or all of the cooling water that exits the second heat-exchanging unit 200 to by-pass the first heat-exchanging unit 100;

the second flow path structure 132, i.e. the space surrounding the tubes 131; and four main cooling water outlets 109-112 distributed around the apparatus 10 at the second (lower) end portion 102 of the first heat-exchanging unit 100 arranged in fluid communication with the second flow path structure 132.

The by-pass duct 60 is preferably arranged in connection with the pipe structure that connects the outlets 209-212 with the inlets 105-108 (and thus connects the fourth and second flow path structures 234, 132). The pipe structure can be provided onto the apparatus 50 on the outside of the housing 50.

If no by-pass duct 60 is present, or if the by-pass duct 60 does not have any particular effect on the design of the pipe structure, the pipe structure can simply consist of four separate pipes, each of which connecting a cooling water outlet 209-212 with a corresponding cooling water inlet 105-108 located vertically below.

Cooling water can thus flow through the apparatus 10 from a top part thereof to a bottom part thereof with a "by-pass" around the central space 53.

Figure 4:
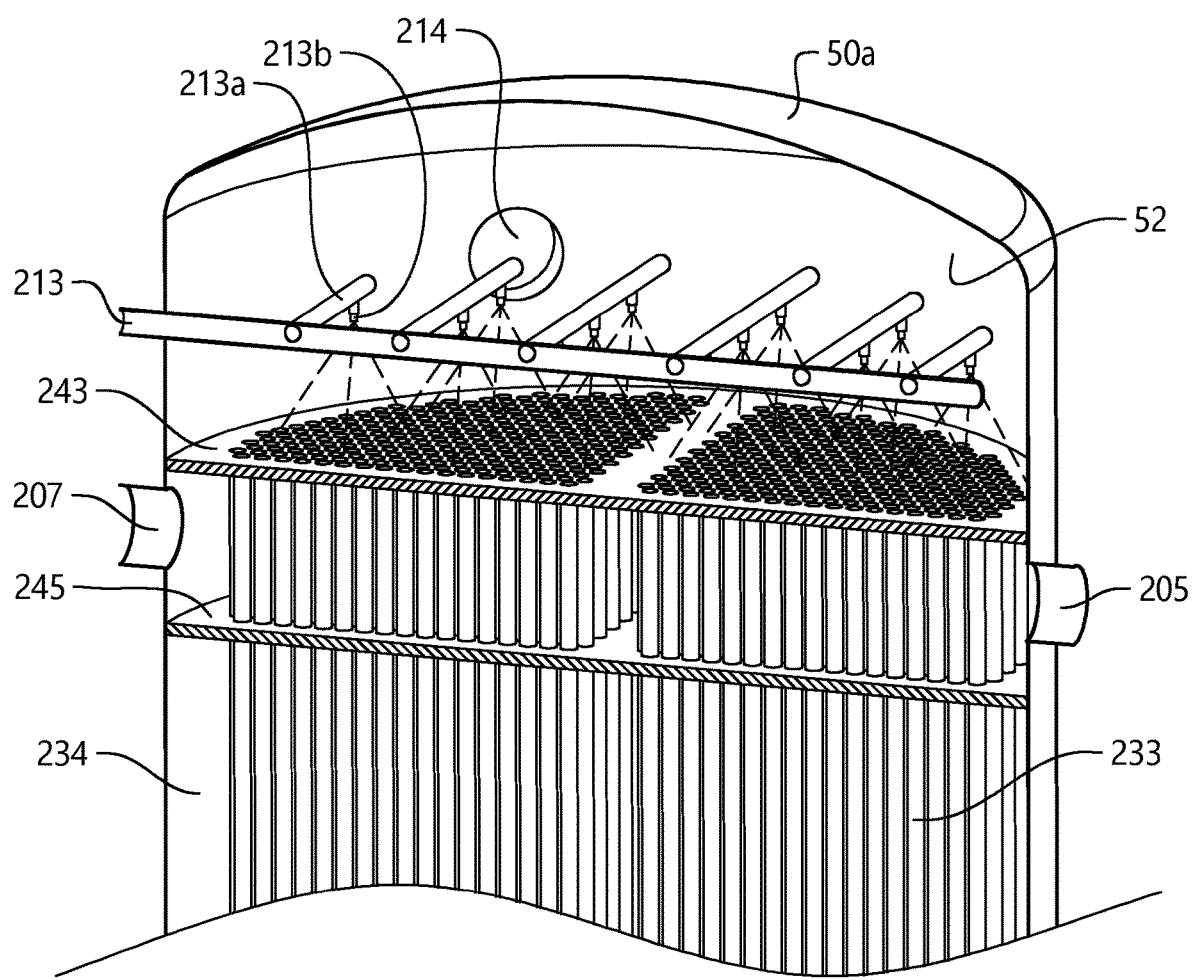
FIG. 4 shows a magnified view of an upper part of the cross-section of FIG. 3.

The channels/tubes forming the first and third flow path structures 131, 233 have open ends at the lower and upper end portions of the first and second heat-exchanging units 100, 200, respectively. Upper tube ends are shown in FIGS. 4 and 5. The lower tube ends are similar. As shown in FIGS. 3-5, the second and fourth flow path structures 132, 234 extend along an outside of the channels/tubes so as to allow heat transfer through walls of the channels/tubes between a fluid inside the channels (which in the example is a mix of steam and evaporated components flowing upwards and condensed water and components flowing/running downwards) and another fluid outside of the channels (which in the example is cooling water flowing/running downwards).

A first sealing plate 141 is arranged at the upper end portion 101 of the first heat-exchanging unit 100, see FIGS. 3 and 5. The first sealing plate 141 extends across the first heat-exchanging unit 100 and forms an upper limitation for the second flow path structure 132. Further, the first sealing plate 141 is provided with holes adapted to the channels/tubes of the first flow path structure 131 allowing the channels/tubes 131 to extend in a sealed manner to or through the holes so that the fluid in the first flow path structure 131 can pass the first sealing plate 141 but not the fluid in the second flow path structure 132.

A similar, second sealing plate 142 is arranged at the lower end portion 102 of the first heat-exchanging unit 100 that forms a lower limitation for the second flow path structure 132.

The second heat-exchanging unit 200 is provided with corresponding third and fourth sealing plates 243, 244, see FIGS. 3 and 4. The third sealing plate 243 forms a lower limitation for the upper space 52 as shown in FIG. 4.

The first and fourth sealing plates 141, 244 form lower and upper limitations, respectively, for the central space 53 as shown in FIG. 5.

FIG. 5 shows further that each of the tubes 131 in the first heat-exchanging unit 100 is provided with an insert 135 extending inside the tube 131 and somewhat above the first sealing plate 141. The inserts has in this example an X- or +-shaped cross section. The purpose of the inserts 135 is to increase turbulence and heat transfer. The inserts 135 may have a cross section with another shape. Preferably, the inserts 135 are perforated to better even out any radially directed differences in pressure or composition in the tube 131.

As shown in FIGS. 3 and 5 the tubes 131 are grouped together in, in this example, four sections 131*a*, 131*b* (only two sections are shown in the figures), wherein each section 131*a*, 131*b* occupies roughly one quarter of the circular cross section of the first heat-exchanging unit 100. The sections are separated by some distance from each other. Tub walls 137 are arranged onto the first sealing plate 141 in the central space 53 so as to enclose each of the sections 131*a*, 131*b* (see FIG. 5). The tub walls 137 extend some distance vertically upwards, towards the nozzles 118*b* but far from all the way to the nozzles 118*b*, so as to form a tub at each tube section 131*a*, 131*b* on an upper side of the first sealing plate 141.

The tub walls 137 are separated from each other so as to define open flow channels onto the first sealing plate 141 between tub walls 137 facing each other. In this case the flow channels form four radially directed and circumferentially evenly distributed flow channels that extend from a lateral centre point of the sealing plate 141, where the channels are in fluid communication with each other, towards the outer housing 50 of the apparatus 10. Central outlets 113-116 are arranged in the housing at the end points of these flow channels.

The purpose of the tub walls 137 and the associated tubs and flow channels etc., is to allow decanting and separation of a component in the mixed liquid that has such physical properties (volatility, density, solubility) that it accumulates in the central space 53, i.e. in the tubs described above, and in particular that it accumulates on top of a more dense liquid in the tubs so that mainly the component in question flows over the tub walls 137 and into the flow channels and further out through the central outlets 113-116. In the example focused on in this disclosure, this component would typically be turpentine (that accumulates on top of water in the tubs). The flow discharged from outlets 113-116 is typically further treated using e.g. an external decanter to further clean/purify the turpentine.

The exact design of the tube sections, tub walls, flow channels and central outlets etc. can differ from what is described above.

Moreover, a first cooling water distribution plate 145 is arranged at the upper end portion 101 of the first heat-exchanging unit 100, see FIGS. 3 and 5. The first distribution plate 145 extends across the first heat-exchanging unit 100 in parallel to and at some distance below the first sealing plate 141 so as to form an accumulation space for cooling medium between the first sealing plate 141 and the first distribution plate 145. The four cooling water inlets 105-108 are arranged between the first sealing plate 141 and the first distribution plate 145 so that cooling water is fed into this accumulation space.

The first distribution plate 145 is provided with holes that fit circumferentially around the tubes/channels 131 but the holes are slightly larger than the outer circumference of the tubes 131 so that narrow drainage openings 146 are formed at or along a circumference of the outer walls of the tubes 131.

Figure 6:
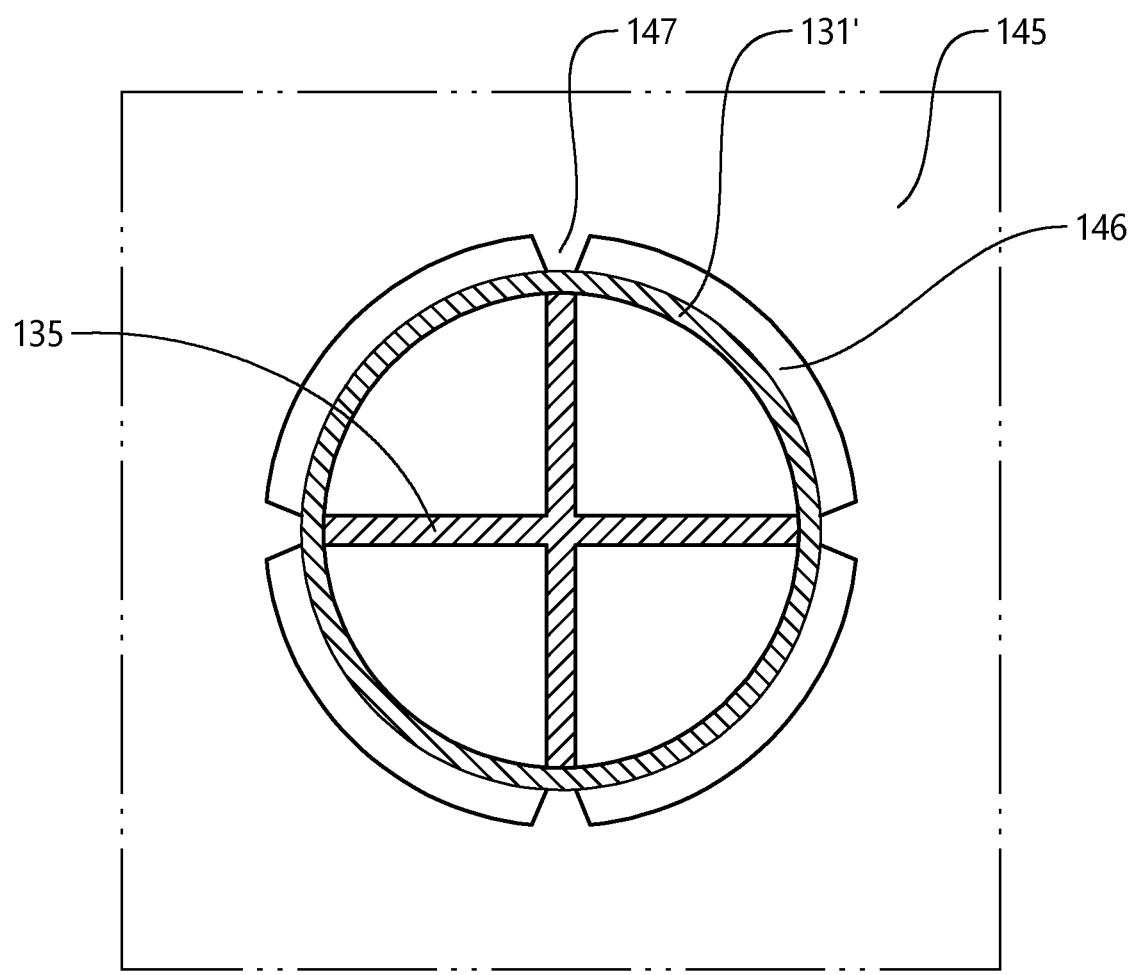
FIG. 6 shows a detail of a part shown in FIG. 5.
Figure 7:
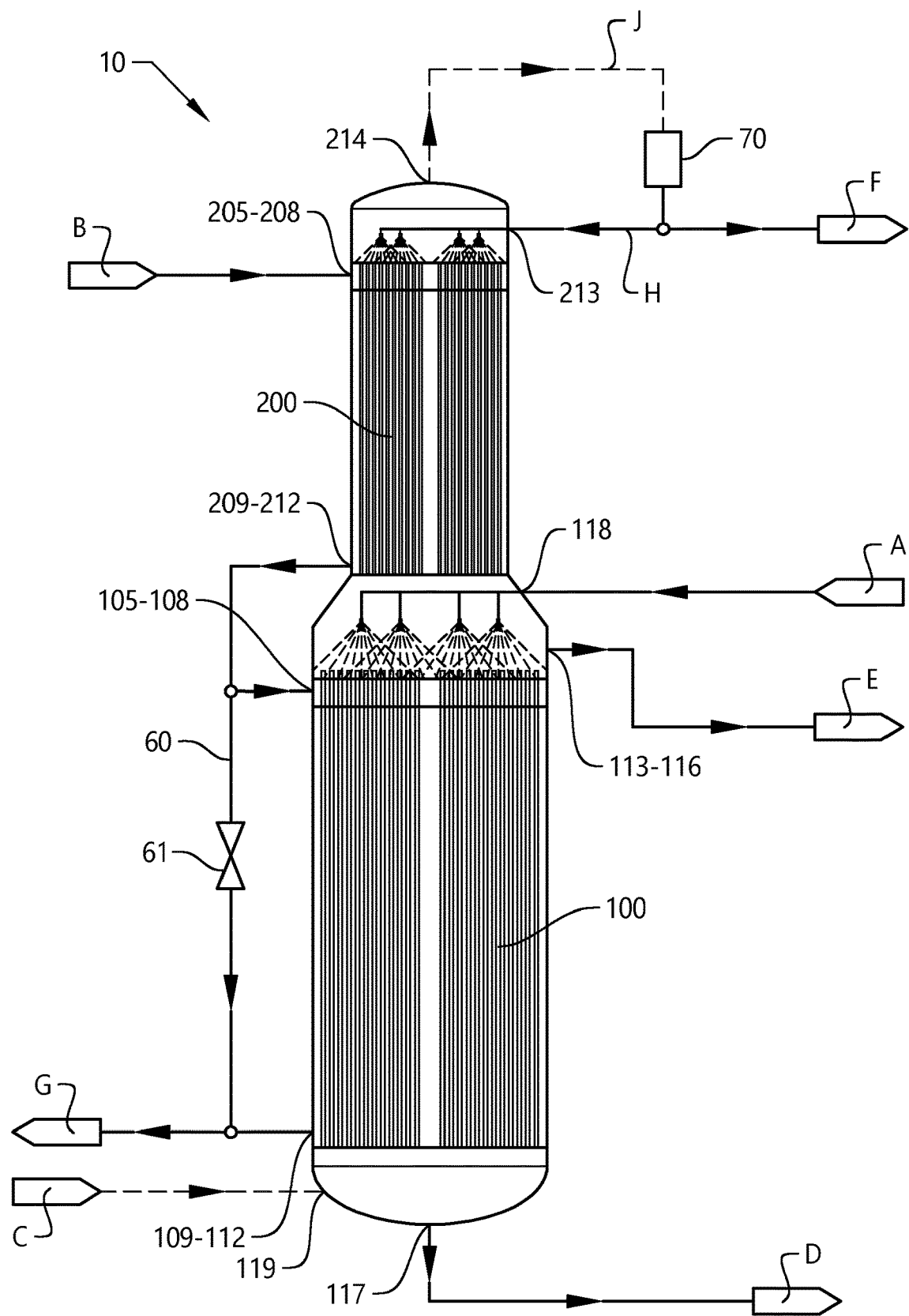
FIG. 7 shows a schematic view of an exemplified process flow diagram including the apparatus of FIG. 1.

This is shown more clearly in FIG. 6 where a certain tube 131' forms an example of the tubes 131. FIG. 6 shows a cross section of the circular tube 131' and the insert 135 at the first distribution plate 145. An annular drainage opening 146 is provided around the tube 131', which in this case is separated into four annular sections by four spacing elements 147 circumferentially distributed around the tube 131'. The spacing elements 147, which in this case form integral parts of the first distribution plate 145, are arranged between the outer walls of the tube 131' and the first distribution plate 145 so as to position the tube 131' properly in the channel hole (of which a part form the drainage opening 146).

Cooling water fed into the accumulation space above the first distribution plate 145 will distribute evenly over the cross section of the apparatus 10 and flow/run through the drainage openings 146 along the outer walls of each of the tubes 131.

A similar second distribution plate 245 is arranged in the upper portion 201 of the second heat-exchanging unit 200, see FIGS. 3 and 4. The arrangement with cooling water inlets, cooling water accumulation space, drainage openings etc. is similar to what has been described above in relation to the first heat-exchanging unit 100.

The apparatus 10 further comprises an outlet 117 for removing condensed components of the incoming mixed fluid from the apparatus 10. This outlet 117 is arranged in the lower space 54 in lower portion 102 of the first heat-exchanging unit 100 in fluid communication with the first flow path structure 131.

An outlet 214 for removing evaporated components of the incoming mixed fluid from the apparatus 10 is arranged in the upper space 52 in the upper portion 201 of the second heat-exchanging unit 200 in fluid communication with the third flow path structure 233.

An inlet 213 for feeding recirculated components (reflux) to the apparatus 10, in this case a fraction (in liquid form) of the components previously removed in evaporated form, is also arranged in the upper space 52 in the upper portion 201 of the second heat-exchanging unit 200 in fluid communication with the third flow path structure 233.

In similarity to the inlet 118 for feeding mixed liquid to the apparatus, the inlet 213 for feeding the recirculated components to the apparatus comprises a number of pipes 213a and spray nozzles 213b arranged on an inside of the apparatus 10 above the second heat-exchanging unit 200 in the upper space 52. The nozzles 213b are arranged to distribute the refluxed liquid over the cross-sectional area of the apparatus 10.

The upper space 52 at the upper portion 201 of the second heat-exchanging unit 200 is thus in fluid communication with the third flow path structure 233, the inlet 213 for recirculated components and the outlet 214 for removing evaporated components.

The lower space 54 at the lower portion 102 of the first heat-exchanging unit 100 is in fluid communication with the first flow path structure 131, the inlet 119 for feeding steam to the apparatus 10 and the outlet 117 for removing condensed components.

The outer housing 50 of the apparatus 10, including the lid 50a and the bottom 50b, forms an outer limitation for the second and fourth flow path structures 132, 234 (including the cooling water accumulation spaces), for the central space 53 between the first and second heat-exchanging units 100, 200, and for the upper and lower spaces 52, 54.

Typically, a flow of mixed liquid and steam forms the first flow and a flow of cooling medium forms the second flow during operation of the apparatus 10.

FIG. 7 shows a schematic view of a process flow diagram, including the apparatus 10, relating to separation of components with different volatility in a mixed fluid in the form of unclean condensate generated in a plant for producing chemical or semi-chemical cellulose pulp.

Incoming flows i FIG. 7:
A—mixed liquid/unclean condensate
B—fresh (cold) cooling water
C—steam
Outgoing flows in FIG. 7:
D—clean condensate
E—other components/turpentine
F—evaporated and condensed components/methanol
G—used (warm) cooling water
A fraction of the evaporated and condensed components/methanol, flow H, is recirculated into the apparatus 10.

Dashed lines indicate steam/vapour; solid lines indicate liquid.

Component 70 is a condenser for evaporated components, in this example mainly methanol. Condensers useful for this purpose are known as such.

The flow J form the top of the apparatus 10 to the condenser 70 (dashed line) is thus a flow of evaporated components/methanol.

FIG. 7 shows a simplified process flow diagram and does not show, for instance, various pumps, a flow of cooling water to the condenser 70, etc.

The process of FIG. 7 has already been described above. In short the process works as follows:
unclean condensate (flow A; generated in a plant for producing chemical or semi-chemical cellulose pulp) is fed to inlet 118 and sprayed downwards onto the first (lower) heat-exchanging unit (100);
cooling water (flow B) is fed to the inlets 205-208 at the top of the second (upper) heat-exchanging unit 200 and flows downwards through the apparatus 10 on an outside of the tubes (via outlets 209-212, connecting pipes and inlets 105-108) towards main outlets 109-112 at the bottom of the apparatus 10 forming outgoing flow G; by opening valve 61 a portion of the flow of cooling water can by-pass the first heat-exchanging unit 100 via by-pass duct 60; and
steam (flow C) is fed to inlet 119.

The steam fed to the inlet 119 can be taken from the last evaporation effect in an evaporation line of the plant. This should be the effect that has the lowest temperature and pressure in order to achieve the desired results.

Steam and evaporated components flow upwards through the tubes of the apparatus 10, i.e. in a counter-current in relation to the cooling water (which provides for a high temperature difference), and condensed steam and components flow/run downwards. The concentration of volatile components increases in the upward direction of the apparatus 10.

A clean condensate is removed at the bottom of the apparatus 10 via outlet 117 and volatile components, mainly methanol but also some gases, is removed via outlet 214. The methanol is condensed in condenser 70 and removed in flow F. A portion of the condensed methanol is refluxed via inlet 213 (flow H).

Turpentine and/or other products that accumulate in the central space 53 are removed via outlets 113-116 (flow E).

Vent gases may also be fed to the apparatus. The vent gases from the evaporation line of the plant can be fed into the central space 53. These gases will be stripped and be concentrated in the upper heat-exchanging unit 200.

The temperature of the steam fed to the apparatus is typically around 50-60° C. The steam condenses and the temperature gradually decreases in the upwards direction of the apparatus 10. The methanol or mix of evaporated components leaving the outlet 214 is typically around 20-25° C.

The apparatus 10 is operated under partial vacuum. The pressure can be regulated depending on the particular application. The pressure can be regulated by regulating the cooling water (temperature and/or mass flow).

The concentration of methanol in the gas phase (i.e. in the mix of evaporated components) increases in the upwards direction of the apparatus 10. The flow J leaving the outlet 214 may contain 80-95% methanol. To condensate steam high up in the second heat-exchanging unit 200 at a low pressure and with a high concentration of methanol in a mix of evaporated components, a low temperature of the cooling water is needed and counter-current flow of cooling water is thus a great advantage.

A low pressure is useful in that a greater portion of the methanol will be present in the vapour phase, which gives a more pure clean condensate.

The by-pass duct 60 can be used to increases the amount of steam reaching the second heat-exchanging unit 200. This has the effect of further purifying the clean condensate. Under normal operating conditions the by-pass valve 61 is typically kept closed.

It is a particular advantage of feeding the mixed fluid/the unclean condensate to the middle of the apparatus 10, i.e. in this case to the central space 53 between the first and second heat-exchanging units 100, 200. It would of course be much simpler to feed the mixed fluid to the top of the apparatus, in which case the apparatus in practice would form a single heat-exchanging unit. However, this would lead to a poor separation and a low concentration of methanol in the flows J and F.

As an example of size, the apparatus 10 may have a total height of around 20-25 m and a diameter of 4-5 m. The height of the legs 51 may be around 4 m.

The invention is not limited by the embodiments described above but can be modified in various ways within the scope of the claims.

The apparatus 10 may be arranged on top of the last evaporation effect in the evaporation line of the plant.

The apparatus 10 may also be used in other applications where separation of compounds with different boiling points is desired. An example is separation of acetic acid and acetic anhydride. Another example is separation of water and ethanol.

REFERENCE NUMBERS

10 apparatus
50 outer housing of apparatus
50*a* apparatus lid
50*b* apparatus bottom
51 legs
52 upper space
53 central space
54 lower space
60 cooling water by-pass duct
61 cooling water by-pass valve
70 condenser for evaporated components/methanol
100 first (lower) heat-exchanging unit
101 upper end portion of first heat-exchanging unit
102 lower end portion of first heat-exchanging unit
105-108 cooling water inlets on first heat-exchanging unit
109-112 cooling water outlets on first heat-exchanging unit
113-116 central outlets
117 condensate outlet
118 mixed liquid inlet
118*a* pipes
118*b* spray nozzles
119 steam inlet
131 first flow path structure (tubes)
131*a*, 131*b* tube sections
132 second flow path structure (space surrounding tubes)
135 tube inserts
141 first sealing plate
142 second sealing plate
145 first distribution plate
146 annular drainage openings
147 spacing elements at drainage openings
200 second (upper) heat-exchanging unit
201 upper end portion of second heat-exchanging unit
202 lower end portion of second heat-exchanging unit
205-208 cooling water inlets on second heat-exchanging unit
209-212 cooling water outlets on second heat-exchanging unit
213 inlet for recirculated product (reflux/feedback)
214 outlet for evaporated components
233 third flow path structure (tubes)
234 fourth flow path structure (space surrounding tubes)
243 third sealing plate
244 fourth sealing plate
245 second distribution plate
Flows:
A—mixed liquid/unclean condensate
B—fresh (cold) cooling water
C—steam
D—clean condensate
E—other components/turpentine
F—evaporated and condensed components/methanol
G—used (warm) cooling water
H—reflux flow of fraction of evaporated and condensed components
J—evaporated components

The invention claimed is:

1. Apparatus for separation of components with different volatility in a mixed fluid,
said apparatus comprising:
a first heat-exchanging unit provided with first and second flow path structures extending between a first and a second end portion thereof and forming separate flow paths for a first and a second fluid flow through the first heat-exchanging unit,
wherein the first end portion forms an upper portion and the second end portion forms a lower portion of the first heat-exchanging unit during operation of the apparatus,
an inlet for feeding the mixed fluid to the apparatus, wherein the mixed fluid feeding inlet is arranged in fluid communication with the first flow path structure at the upper end portion of the first heat-exchanging unit,
an inlet for feeding steam to the apparatus, wherein the steam feeding inlet is arranged in fluid communication with the first flow path structure at the lower end portion of the first heat-exchanging unit,
an arrangement for feeding a cooling medium through the apparatus, wherein said arrangement comprises at least one cooling medium inlet arranged in fluid communication with the second flow path structure at the first end portion of the first heat-exchanging unit,
characterized in that the apparatus comprises a second heat-exchanging unit arranged at the first end portion of the first heat-exchanging unit so as to be located above the first heat-exchanging unit during operation of the apparatus,
wherein the second heat-exchanging unit is provided with third and fourth flow path structures extending between a first/upper and a second/lower end portion thereof and forming separate flow paths for a first and a second fluid flow through the second heat-exchanging unit, wherein the first portion forms an upper end portion and the second portion a lower end portion of the second heat-exchanging unit during operation of the apparatus, wherein the cooling medium arrangement comprises at least one cooling medium inlet arranged in fluid communication with the fourth flow path structure at the first (upper) end portion of the second heat-exchanging unit, and wherein the first and third flow path structures are arranged in fluid communication with each other so that a flow of evaporated fluid exiting the first flow path structure at the upper end portion of the first heat-exchanging unit can flow further upwards into the third flow path structure of the second heat-exchanging unit and so that a flow of condensed fluid exiting the third flow path structure at the lower end portion of the second heat-exchanging unit can flow further downwards into the first flow path structure of the first heat-exchanging unit.

2. Apparatus according to claim 1, wherein the second and fourth flow path structures are arranged in fluid communication with each other so that a flow of cooling medium exiting the fourth flow path structure at the lower end portion of the second heat-exchanging unit can flow further downwards into the second flow path structure of the first heat-exchanging unit.

3. Apparatus according to claim 2, wherein the apparatus is provided with a cooling medium by-pass duct arranged in fluid communication with the fourth flow path structure.

4. Apparatus according to claim 3, wherein the cooling medium by-pass duct arranged in fluid communication with the fourth flow path structure is in connection to the lower end portion of the second heat-exchanging unit so that at least a portion of the cooling medium flowing downwards through the second heat-exchanging unit towards the first heat-exchanging unit during operation of the apparatus can be fed out from the apparatus before reaching the first heat-exchanging unit.

5. Apparatus according to claim 1, wherein a main cooling medium feed inlet is arranged at the upper end portion of the second heat-exchanging unit in fluid communication with the fourth flow path structure.

6. Apparatus according to claim 1, wherein the first flow path structure comprises a set of channels having open ends at the lower and upper end portions of the first heat-exchanging unit, and wherein the second flow path structure extends along an outside of the channels so as to allow heat transfer through walls of the channels between a fluid inside the channels and another fluid outside of the channels.

7. Apparatus according to claim 6, wherein a first sealing plate is arranged at the upper end portion of the first heat-exchanging unit, wherein the sealing plate extends across the first heat-exchanging unit and forms an upper limitation for the second flow path structure.

8. Apparatus according to claim 7, wherein the first sealing plate is provided with holes adapted to the channels of the first flow path structure allowing the channels to extend in a sealed manner to or through the holes so that a fluid in the first flow path structure can pass the sealing plate but not a fluid in the second flow path structure.

9. Apparatus according to claim 7, wherein a first distribution plate for the cooling medium is arranged at the upper end portion of the first heat-exchanging unit, wherein the first distribution plate extends across the first heat-exchanging unit at some distance below the first sealing plate so as to form an accumulation space for cooling medium between the first sealing plate and the first distribution plate.

10. Apparatus according to claim 9, wherein the first distribution plate is provided with channel holes that fit circumferentially around the channels but that are larger than the channels so that narrow drainage openings are formed at or along a circumference of the outer walls of the channels.

11. Apparatus according to claim 10, wherein spacing elements are arranged at the drainage openings between the outer walls of the channels and the first distribution plate so as to position the channel properly in the channel hole.

12. Apparatus according to claim 11, wherein the spacing elements form part of the first distribution plate.

13. Apparatus according to claim 1, wherein a second sealing plate is arranged at the lower end portion of the first heat-exchanging unit, wherein the sealing plate extends across the first heat-exchanging unit and forms a lower limitation for the second flow path structure.

14. Apparatus according to claim 1, wherein an outlet for removing condensed components of the incoming mixed fluid from the apparatus is arranged in the lower portion of the first heat-exchanging unit in fluid communication with the first flow path structure.

15. Apparatus according to claim 14, wherein the apparatus comprises a lower space arranged at the lower portion of the first heat-exchanging unit in fluid communication with the first flow path structure, the inlet for feeding steam to the apparatus and the outlet for removing condensed components of the incoming mixed fluid from the apparatus.

16. Apparatus according to claim 1, wherein an outlet for removing evaporated components of the incoming mixed fluid from the apparatus is arranged in the upper portion of the second heat-exchanging unit in fluid communication with the third flow path structure.

17. Apparatus according to claim 1, wherein an inlet for feeding recirculated components to the apparatus is arranged in the upper portion of the second heat-exchanging unit in fluid communication with the third flow path structure.

18. Apparatus according to claim 17, wherein the inlet for feeding the recirculated components to the apparatus comprises at least one spray nozzle.

19. Apparatus according to claim 17, wherein the apparatus comprises an upper space arranged at the upper portion of the second heat-exchanging unit in fluid communication with the third flow path structure, the inlet for feeding the recirculated components to the apparatus and the outlet for removing evaporated components of the incoming mixed fluid from the apparatus.

20. Apparatus according to claim 1, wherein the apparatus comprises a central space between the first and the second heat-exchanging units, wherein the central space forms a fluid communication between the first and the third flow path structures.

21. Apparatus according to claim 20, wherein a central outlet is arranged in the central space for removing components that accumulate in the central space during operation of the apparatus.

22. Apparatus according to claim 20, wherein the inlet for feeding the mixed fluid to the apparatus is arranged in the central space.

23. Apparatus according to claim 1, wherein the inlet for feeding the mixed fluid to the apparatus comprises at least one spray nozzle arranged on an inside of the apparatus above the first heat-exchanging unit.

24. Apparatus according to claim 1, wherein the apparatus comprises a housing that forms an outer limitation for the second and fourth flow path structures.

25. Apparatus according to claim 24, wherein the apparatus comprises a central space between the first and the second heat-exchanging units, wherein the central space forms a fluid communication between the first and the third flow path structures, and wherein the housing forms an outer limitation also for the central space between the first and second heat-exchanging units.

26. Apparatus according to claim 1, configured such that a flow of mixed liquid and steam forms the first flow and a flow of cooling medium forms the second flow during operation of the apparatus.

27. Plant for producing chemical or semi-chemical cellulose pulp,
characterized in that the plant comprises an apparatus according to claim 1; and
wherein the plant comprises equipment that, during operation of the plant, generates an unclean condensate containing components with different volatility, wherein the plant is configured to feed the unclean condensate to the mixed fluid feeding inlet of the apparatus.

28. Method for separation of components with different volatility in a mixed fluid using an apparatus according to claim 1,
characterized in that that the method comprises the steps of:
feeding the mixed fluid to the mixed fluid feeding inlet;
feeding steam to the steam feeding inlet;
feeding coolant medium to the fourth flow path structure at the upper end portion of the second heat-exchanging unit;
removing condensed components of the incoming mixed fluid from the apparatus via a first outlet arranged in the lower end portion of the first heat-exchanging unit in fluid communication with the first flow path structure;
removing evaporated components of the incoming mixed fluid from the apparatus via a second outlet arranged in the upper portion of the second heat-exchanging unit in fluid communication with the third flow path structure;
removing heated coolant medium from the second flow path structure at the lower end portion of the first heat-exchanging unit.

29. Method according to claim 28, wherein the method further comprises the step of:
feeding recirculated components to the apparatus.

30. Method according to claim 29, wherein the feeding recirculated components to the apparatus comprises a fraction of the components removed in evaporated form, via an inlet arranged in the upper end portion of the second heat-exchanging unit in fluid communication with the third flow path structure.

31. Method according to claim 28, wherein the mixed fluid is an unclean condensate generated in a plant for producing chemical or semi-chemical cellulose pulp.

32. Method according to claim 28, wherein the evaporated components include methanol.

* * * * *